(12) United States Patent
Broyles et al.

(10) Patent No.: US 8,324,563 B2
(45) Date of Patent: Dec. 4, 2012

(54) CONTAINER WITH FOIL SEAL

(75) Inventors: Michael J. Broyles, Tucson, AZ (US);
Terry M. Sanderson, Tucson, AZ (US);
Douglas M. Beard, Tucson, AZ (US);
Brian D. Alfing, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 300 days.

(21) Appl. No.: 12/752,221

(22) Filed: Apr. 1, 2010

(65) Prior Publication Data
US 2011/0240647 A1    Oct. 6, 2011

(51) Int. Cl.
*H01J 5/02*    (2006.01)
(52) U.S. Cl. ..................................................... 250/239
(58) Field of Classification Search .................. 250/239; 220/277; 206/701; 277/312
See application file for complete search history.

(56) References Cited

U.S. PATENT DOCUMENTS

| 4,264,868 | A | * | 4/1981 | Leland et al. | 359/342 |
|---|---|---|---|---|---|
| 4,840,520 | A | * | 6/1989 | Pfalzgraf | 409/232 |
| 6,708,735 | B1 | * | 3/2004 | Kenihan | 141/18 |
| 2004/0026422 | A1 | * | 2/2004 | Westphal | 220/277 |
| 2008/0303219 | A1 | * | 12/2008 | Sanderson et al. | 277/312 |
| 2009/0200182 | A1 | * | 8/2009 | Post-Smith et al. | 206/5.1 |

\* cited by examiner

*Primary Examiner* — Thanh Luu
*Assistant Examiner* — Renee Naphas
(74) *Attorney, Agent, or Firm* — Renner, Otto, Boisselle & Sklar, LLP (57) ABSTRACT

A container includes a housing and a cover which may be wholly or partially removed to open the container. A foil seal is used to seal the joint between the housing and the cover. The foil seal is internal to the container. The foil seal separates during opening of the cover, respective parts of the foil seal remaining with the housing and the cover. The foil seal may be a metal or metal-containing foil, for example being an aluminum, steel, or titanium foil, or a metalized plastic foil. A cutter, such as a serrated edge, may be positioned to facilitate cutting of the foil seal during cover opening. The container may be part of a seeker assembly with the housing being a seeker housing, and the cover being a removable or hinged cover that protects an optical seeker during some portions of flight, such as during launch of a spacecraft.

22 Claims, 7 Drawing Sheets

CONTAINER WITH FOIL SEAL

GOVERNMENT RIGHTS

This invention was made with United States Government support under Contract Number HQ0147-09-D-0001 with the Department of Defense. The United States Government has certain rights in this invention.

BACKGROUND OF THE INVENTION

1. Field of the Invention

The invention is broadly in the field of sealed containers, such as for use as part of seeker assemblies for containing optical seekers.

2. Description of the Related Art

Seeker assemblies used in space generally do not have windows or domes, so optics covers are often installed to protect against damage from foreign object debris (FOD), and to provide a moisture barrier seal during long-term storage. O-ring face seals have typically been used to seal optics covers. However a common problem with this configuration is that O-rings have a tendency to adhere to adjacent metal surfaces over time. This metal-to-elastomer adhesion can cause high and/or unpredictable cover deployment loads, can generate FOD, and can even cause cover deployment failure.

One solution that has been tried is to mitigate the metal-to-elastomer adhesion by using a metal tapered edge sealed against a VITON O-ring. This reduces adhesion by maximizing shear and reducing the likelihood of molecular bonding between the metal and elastomer. However the sticking is only reduced, and not eliminated.

From the foregoing it will be appreciated that improvements addressing the adhesion problem would be desirable.

SUMMARY OF THE INVENTION

According to an aspect of the invention, a container has a separable internal foil seal.

According to another aspect of the invention, a seeker assembly has an internal metal-containing foil seal between its cover and housing.

According to yet another aspect of the invention, a container has a foil seal with respective O-rings pressed against its major surfaces.

According to still another aspect of the invention, a container has an annular foil seal. An outside (outer) portion of the foil seal is mechanically coupled to a cover, and an inside (inner) portion of the foil seal is mechanically coupled to a housing.

According to a further aspect of the invention, a container has a housing and a cover, with respective parts of a foil seal mechanically coupled to the housing and the cover. When the cover opens the foil seal separates at least in part, with the parts of the foil seal remaining coupled to the housing and the cover.

According to a still further aspect of the invention, outer and inner portions of an annular foil seal are coupled by outer and inner annular rings to a cover and a housing, respectively.

According to another aspect of the invention, a seeker assembly includes: a seeker housing; an optical seeker in the seeker housing; a removable cover covering an opening of the seeker housing; and a foil seal between the cover and the housing. The foil seal separates at least in part as the cover is opened.

According to yet another aspect of the invention, a method of opening a sealed container includes the steps of: releasing a tension release device holding a cover against a housing; and pivoting the cover about a hinge that connects the cover to the housing. The pivoting includes separating at least part of a foil seal that provides sealing between the cover and the housing prior to the releasing.

According to still another aspect of the invention, a sealed container includes: a housing; a cover; and an annular foil seal between the housing and the cover. Substantially all of the foil seal is internal to the container, inside an outer surface of the container defined by the housing and the cover.

To the accomplishment of the foregoing and related ends, the invention comprises the features hereinafter fully described and particularly pointed out in the claims. The following description and the annexed drawings set forth in detail certain illustrative embodiments of the invention. These embodiments are indicative, however, of but a few of the various ways in which the principles of the invention may be employed. Other objects, advantages and novel features of the invention will become apparent from the following detailed description of the invention when considered in conjunction with the drawings.

BRIEF DESCRIPTION OF THE DRAWINGS

The annexed drawings, which are not necessarily to scale, show various aspects of the invention.

DETAILED DESCRIPTION

A container includes a housing and a cover which may be wholly or partially removed to open the container. A foil seal is used to seal the joint between the housing and the cover. The foil seal is internal to the container, with substantially all of the foil seal inside an outer surface of the container defined by the housing and the cover. The foil seal separates during opening of the cover, with one part of the foil seal remaining with the housing, and another part of the foil seal staying with the cover. The foil seal may be a metal or metal-containing foil, for example being an aluminum, steel, or titanium foil, or a metalized plastic foil. A cutter, such as a serrated edge, may be positioned to facilitate separation of the foil seal during opening of the cover, such as by cutting or rupturing the foil seal. The container may be part of a seeker assembly with the housing being a seeker housing, and the cover being a removable or hinged cover that protects an optical seeker during some portions of flight, such as during launch of a spacecraft.

Figure 1:
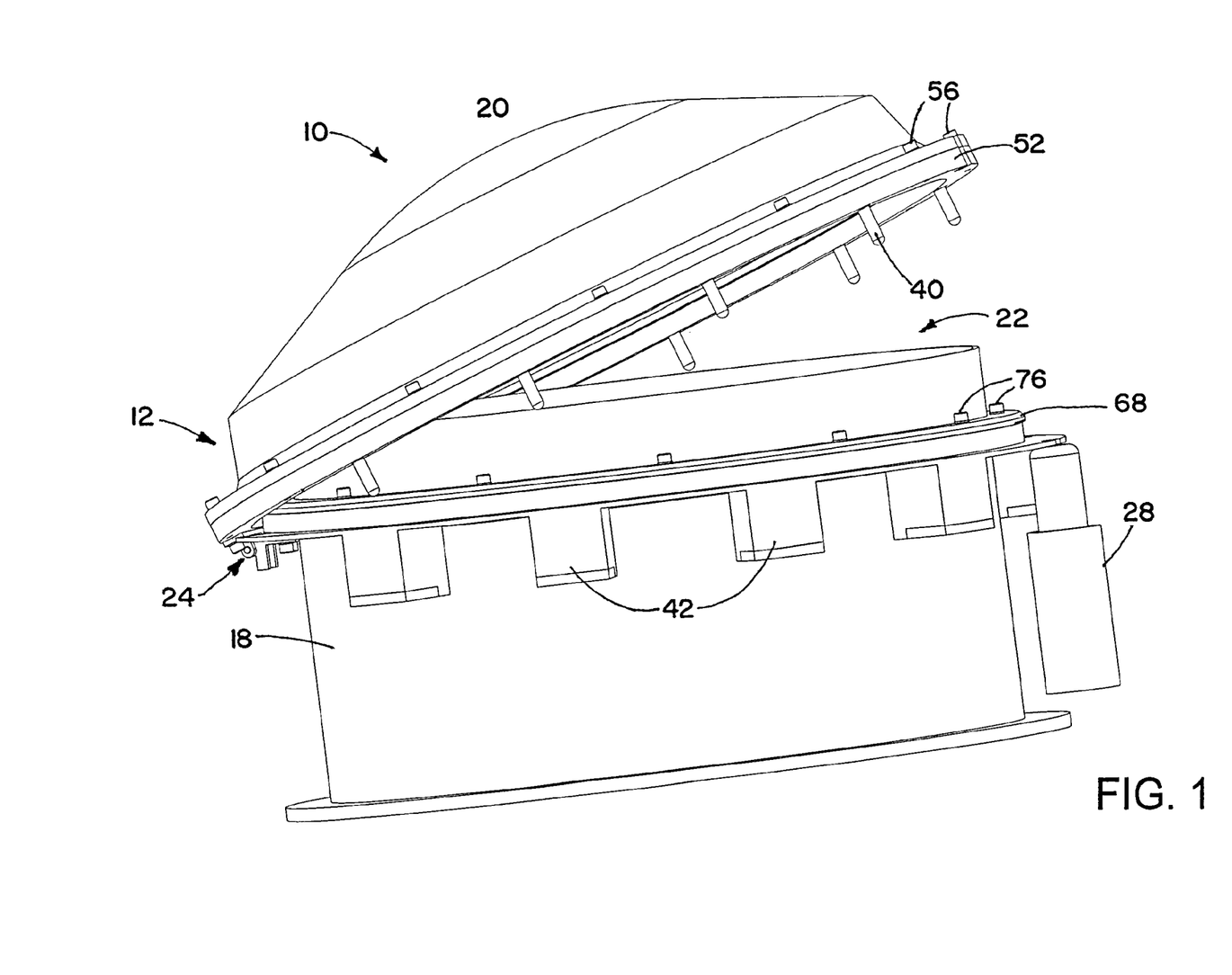
FIG. 1 is an oblique view of a seeker assembly in accordance with an embodiment of the invention.
Figure 2:
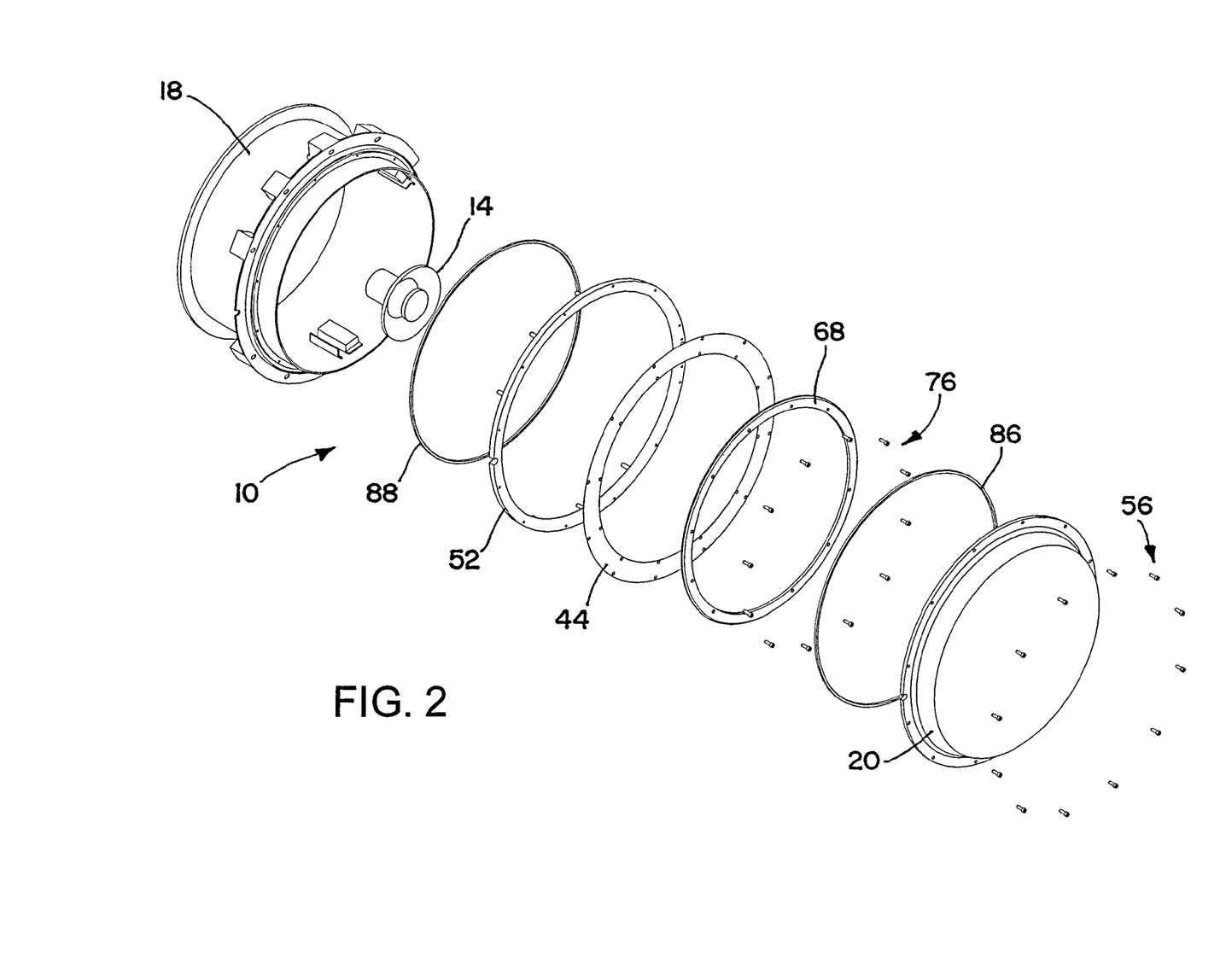
FIG. 2 is an exploded view of the seeker assembly of FIG. 1.
Figure 3:
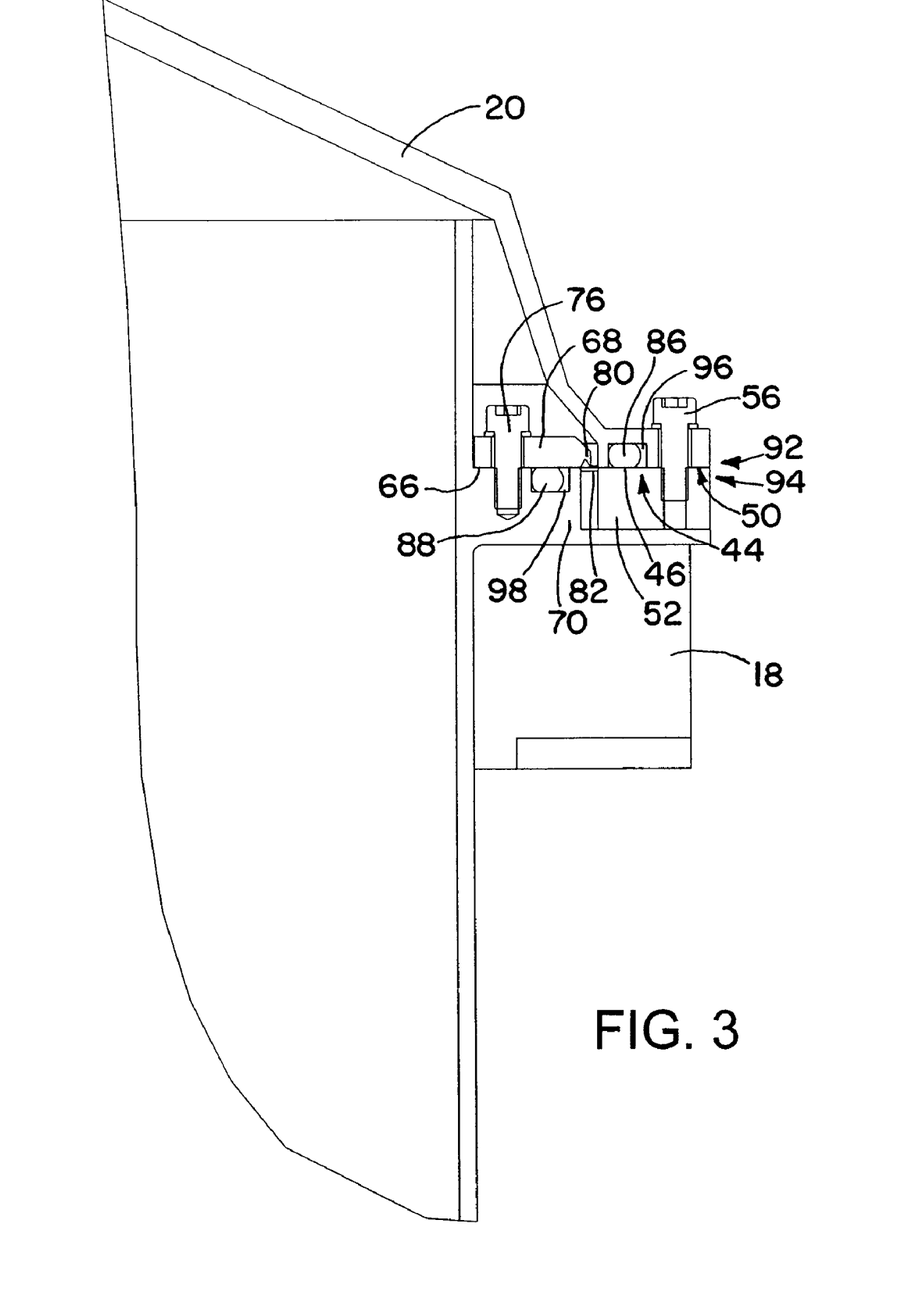
FIG. 3 is a cross-sectional view of part of the seeker assembly of FIG. 1.

Referring initially to FIGS. 1-3, a seeker assembly 10 includes a container 12 that contains an optical seeker 14. The container 12 includes a housing 18 and a cover 20, which are sealed where they join together. The cover 20 covers an opening 22 of the housing 18. Although the particular illustrated embodiment is described below in terms of a seeker housing for housing a seeker, it will be appreciated that the sealing devices and concepts described below may be used in any of a wide variety of other types of containers where sealing is desired, notwithstanding the fact that there may be particular advantage(s) in the context of seeker assemblies.

The cover 20 is hingedly coupled to the housing 18. The cover 20 pivots relative to the housing 18 at a hinge 24. A tension release device 28 is diametrically opposed to the hinge 24. The tension release device 28 may be any of a variety of devices for holding the cover 20 against the housing 18, and for selectively releasing the holding, allowing the cover 20 to pivot on the hinge 24 and move away from the housing 18.

The tension release device 28 may have any of a variety of suitable configurations. As one example, the tension release device 28 may include a ball lock, for instance having a rod that is captured by a ball release mechanism that may be electrically activated to effect release. Another example is a bolt release device, in which an electrically-activated mechanism can selectively release a bolt. A further example is an explosive bolt which has a small charge inside that ignites to shear a bolt or a pin that holds the cover 20 down. A specific example of a suitable off-the-shelf product is the ERM-500 non-explosive actuator available from TiNi Aerospace of San Leandro, Calif., USA. It will be appreciated that other suitable sorts of tension release devices may be employed.

The cover 20 may have a series of pins 40 on its underside that fit into corresponding spring cavities 42 in the housing 18. The pins 40 pass through oval openings in the housing 18 to reach the spring cavities 42. As described in greater detail below, resilient devices such as springs in the spring cavities 42 may be used to provide a force to aid in lifting the cover 20 off of the housing 18, to open up the cover 20.

An annular foil seal 44 is used to provide sealing between the housing 18 and the cover 20. The term foil, as used herein, is intended to refer to a material having a thickness from 0.013 mm to 0.25 mm (0.5 mil to 10 mils). The foil may be at least 0.038 mm (1.5 mils) thick, for example being from 0.038 mm to 0.25 mm (1.5 mils to 10 mils) thick. Another range of suitable thickness is 0.025 mm to 0.063 mm (1 mil to 2.5 mils). These thicknesses provide a good moisture barrier, while still allowing separation (e.g., tearing or cutting) of the foil seal 44. The foil seal 44 has a uniform thickness, although it would be possible for the seal 44 to vary in thickness.

The foil seal 44 is mechanically coupled to both the housing 18 and the cover 20. As the cover 20 is opened, separating from the housing 18, the foil seal 44 separates (divides), with one part of the foil seal 44 remaining with the housing 18, while another part of the foil seal 44 moves with the cover 20. The separation may involve only part of the foil seal 44. Any of a variety of mechanisms may be involved in the separation (in whole or in part) of the foil seal 44. Various terms may be used to describe the separation of the foil seal, such as breaking, fracturing, tearing, or rupturing. The foil seal 44 may be a tearable, rupturable, or frangible foil seal.

The foil seal 44 may be a metal foil, or more broadly may be a metal-containing foil. As a metal foil, the foil seal 44 may be or may include any of a variety of suitable metals, examples being aluminum, copper, and nickel. Aluminum has been found to have good tear properties, enhancing its suitability, but it will be appreciated that a wide variety of other types of metal may be employed.

The foil seal 44 may also be a metal-containing foil that also includes another material or other materials, such as a metalized plastic, for example an aluminized polyethylene terephthalate film. The use of a metal foil or a metal-containing foil aids in preventing ingress of moisture into the interior of the housing 18. Ingress of moisture is highly detrimental to operation of the seeker 14. In other applications using a sealed container, a plastic seal may be appropriate for situations where moisture is less critical.

The foil seal 44 is an internal seal, in that substantially all of the foil seal 44 is internal to the container 12, inside an outer surface of the container 12 defined by outside surfaces of the housing 18 and the cover 20. A foil seal outer portion 46 of the foil seal 44 is coupled to a bottom surface 50 of the cover 20 using an outer ring 52. The foil seal outer portion 46 is clamped between the outer ring 52 and the cover bottom surface 50, with the outer ring 52 coupled to the cover 18 using a series of bolts 56.

A foil seal inner portion 66 is clamped between an inner ring 68 and a ledge 70 of the housing 18. A series of bolts 76 clamps the inner ring 68 (and the foil seal inner portion 66) to the ledge 70.

The inner ring 68 includes a cutter 80 to aid in separating (or cutting) a foil seal middle portion 82 that is between the foil seal outer portion 46 and the foil seal inner portion 66. As discussed further below, the cutter 80 may be an annular serrated surface of the inner ring 68. It will be appreciated that the cutter 80 may have any of a wide variety of other forms or configurations for cutting, tearing, or otherwise separating the foil seal middle portion 82. In addition it will be appreciated that the cutter 80 may alternatively be a part of outer ring 52. The cutter 80 may be an integral part of the outer ring 52 and/or the inner ring 68, or may be a separate part or parts coupled to one or both of the rings 52 and 68. Further, the cutter 80 may be dispensed with altogether, with opening of the cover 20 causing complete or partial separation of the foil seal 44 without use of a cutter.

The location of the foil seal 44, internal to the outer surface of the container 12, protects the foil seal 44 from accidental damage. In particular, the foil seal middle portion 82 is internal to the container 12, preventing access to and protecting the foil seal 44. It will be appreciated that locating the foil seal 44 internally may allow use of a thinner foil seal than might be needed if the foil seal 44 were to have to be subject to possible accidental contact external to the container 12.

The rings 52 and 68 may be made of metal, and may be made of the same material or different materials, and of the same material as the foil seal 44, or different material(s) than the foil seal. For example the foil seal 44 may be made of aluminum, and the rings 52 and 68 may also be made of aluminum.

The housing 18 and the cover 20 may also be made of the same material as the rings 52 and 68, for example being made of aluminum. Other materials that the various parts of the container 12 may be made of include steel, beryllium, and titanium.

A pair of O-ring seals 86 and 88 are used to seal off leak paths 92 and 94 above and below the foil seal 44. The upper/outer O-ring 86 is located in a cavity 96 in the cover 20. The O-ring 86 is pressed against the foil seal outer portion 46 when the outer ring 52 is clamped against the cover 20, sealing off the upper leak path 92. The lower/inner O-ring 88 is located in a cavity 98 in the ledge 70 of the housing 18. The O-ring 88 presses against the foil seal inner portion 66 and seals off the lower leak path 94. The O-rings 86 and 88 are thus pressed against respective top and bottom major surfaces of the foil seal 44, with the O-rings 86 and 88 located in respective parts of the container 12 that foil seal 44 is coupled to.

The O-rings 86 and 88 may be made of any of a variety of suitable materials, for example elastomeric materials such as butyl rubber. It will be appreciated that other mechanisms than the O-rings 86 and 88 may be used to seal off the leak paths 92 and 94. For example the foil seal 44 may be sealingly attached to the housing 18 or the cover 20, such as by use of an adhesive or solder, alleviating the need for one or both of the O-rings 86 and 88.

As the cover 20 opens up away from the housing 18 (pivoting at the hinge 24), the foil seal 44 tears or otherwise separates in the foil seal middle portion 82. The foil seal outer portion 46 remains with the cover 20, and the foil seal inner portion 66 remains with the housing 18. Since the portions 46 and 66 of the foil seal 44 remain in place on their respective parts, there is no separation of them from the O-rings 86 and 88. This avoids the O-ring adhesion problems of previous configurations.

Figure 4:
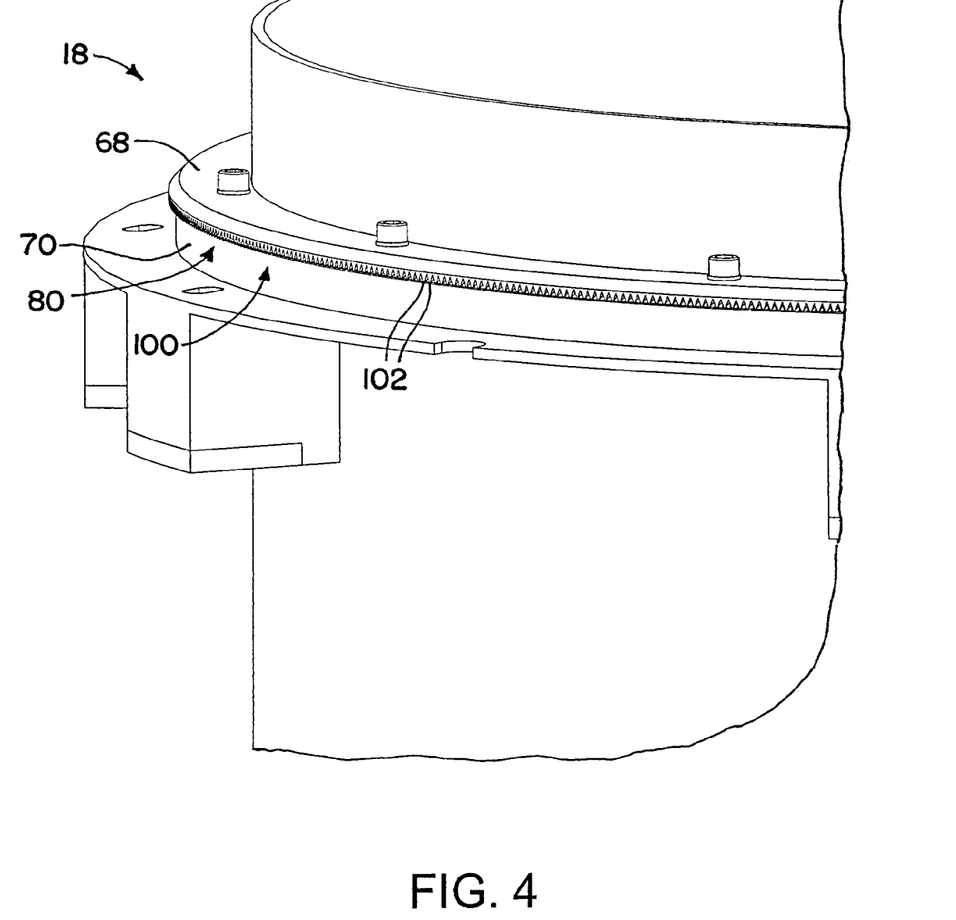
FIG. 4 is an oblique view of part of the housing of the seeker assembly of FIG. 1.

FIG. 4 shows the serrated edge 100 of the inner ring 68 that constitutes the cutter 80. The serrated edge 100 includes a series of teeth 102 that may be spaced substantially uniformly around the perimeter of the inner ring 68. As noted above, the illustrated embodiment is only one type of possible cutter. For example, a sharp edge on one of the rings 52 or 68 may operate as a cutter, aiding in severing or separating the foil seal 44. Although the cutter 80 may be omitted, the cutter 80 may aid in separating the foil seal 44 without separating fragments or pieces of the foil seal 44 that might cause foreign object damage.

Figure 5:
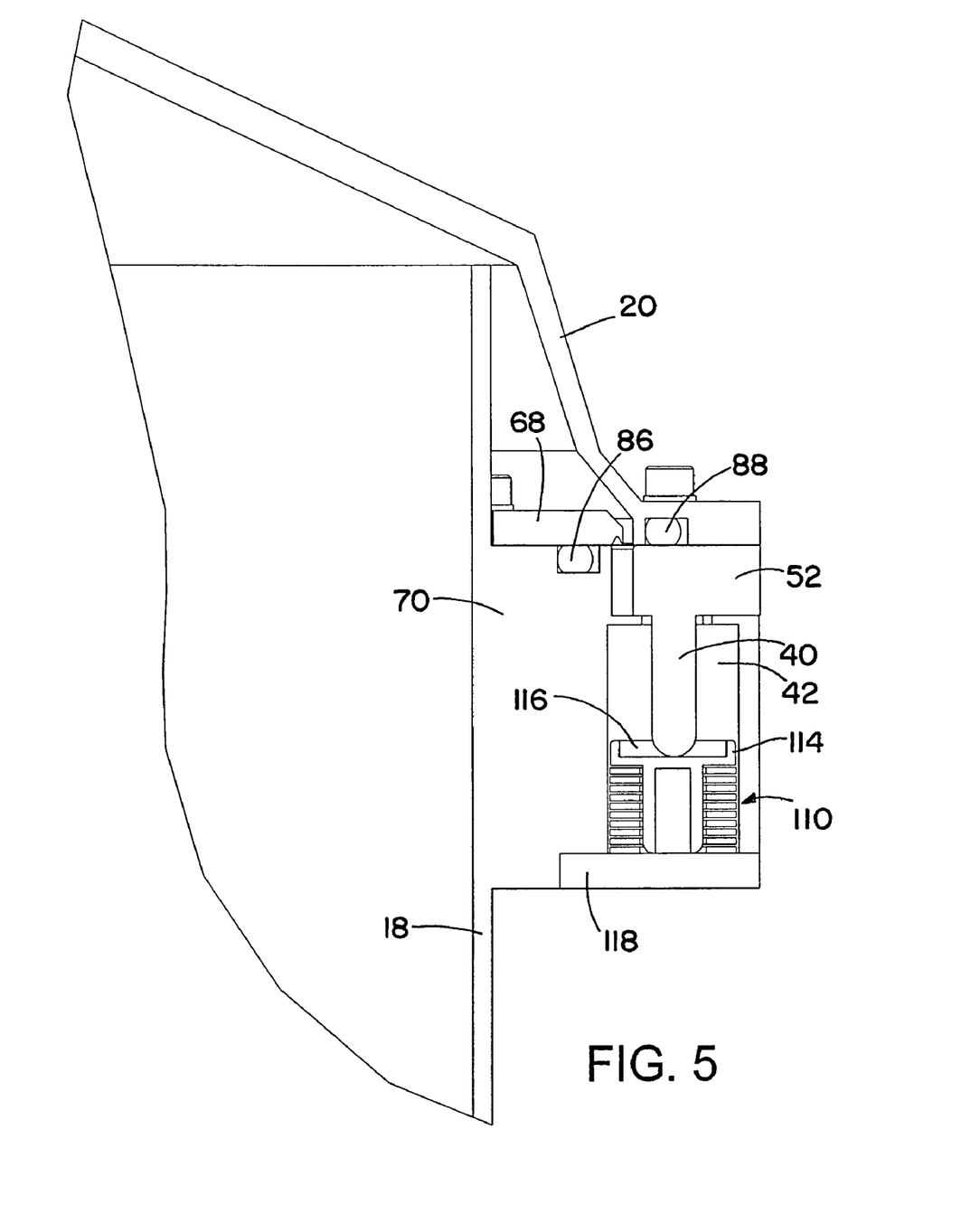
FIG. 5 is a cross-sectional view of one spring configuration used in the housing of the seeker assembly of FIG. 1.
Figure 6:
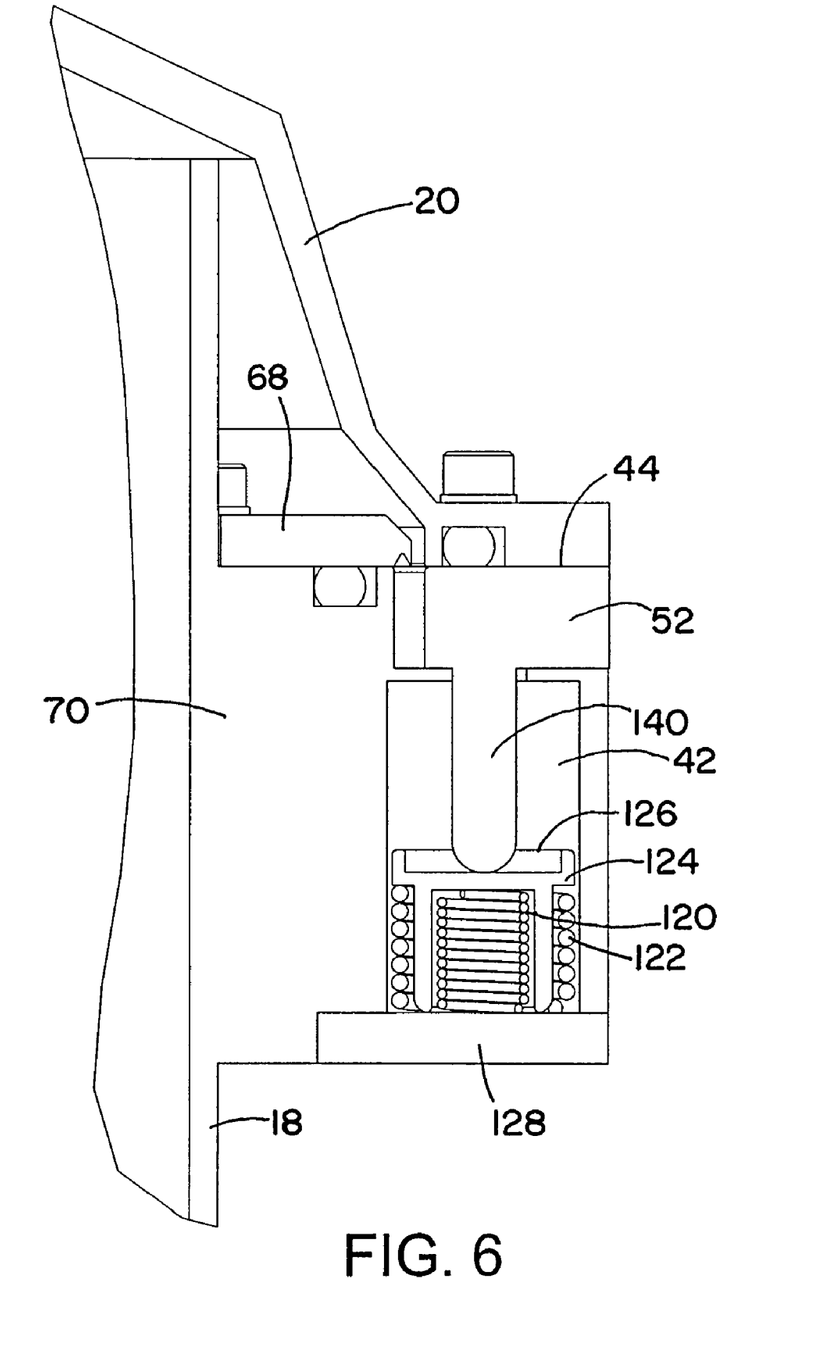
FIG. 6 is a cross-sectional view of another spring configuration used in the housing of the seeker assembly of FIG. 1.

With reference now in addition to FIGS. 5 and 6, the pins 40 engage resilient devices that are in the spring cavities 42. In the illustrated embodiment the housing 18 has eight of the spring cavities 42, although it will be appreciated that more or fewer spring cavities may be employed. FIG. 5 shows the configuration in two of the spring cavities 42, the two closest to the tension release device 28 (FIG. 1). FIG. 6 shows the configuration in the other six of the spring cavities 42, the three on each side that are closest to the hinge 24 (FIG. 1).

In the configuration shown in FIG. 5, the spring cavity 42 has in it a stack of Belleville washers 110 and a spring plug 114. The spring plug 114 is atop of the stack of Belleville washers 110, and fits into the central opening in the middle of the Belleville washers 110. The pin 40 fits into and engages a hollow 116 in the top of the spring plug 114. A spring retainer 118 is used to hold the Belleville washers 110 in the spring cavity 42. The washer stack is biased such that it is in a compressed state when the cover 20 is held against the housing 18 by the tension release device 28. When the tension release device 28 is released, the Belleville washers 110 push the cover 20 away from the housing 18. The Belleville washers 110 provide considerable force to perform the initial lifting of the cover 20 out of engagement with the housing 18, and to start the tearing of the foil seal 44. The Belleville washer stack may provide a force of 444 Newtons to 666 Newtons (100 pounds to 150 pounds), although it will be appreciated that these numbers are only examples.

FIG. 6 shows a spring configuration with a lower lifting force, but with a longer range of travel. FIG. 6's configuration includes a pair of coil springs 120 and 122 that engage a spring plug 124. The pin 40 fits into and engages a hollow 126 at the top of the spring plug 124. An inner coil spring 120 fits within the spring plug 124, and an outer coil spring 122 is around part of spring plug 124. The coil springs 120 and 122 are in a compressed state when the cover 20 is held against the housing 18 by the tension release device 28. A spring retainer 128 is used to hold the coil springs 120 and 122 in the spring cavity 42. When the tension release device 28 is released, the coil springs 120 and 122 push the cover 20 away from the housing 18. Although the Belleville washers 110 (FIG. 5) provide more force, the coil springs 120 and 122 have the advantage of providing force over a longer range of travel. In operation, the Belleville washers 110 may provide the initial impetus to begin motion of the cover 20, while the coil springs 120 and 122 provide the force to continue opening of the cover 20 to its fully open position.

It will be appreciated that only a single spring configuration may be employed, if desired, notwithstanding the advantages of using different types of springs in different of the spring cavities 42. It also will be appreciated that a wide variety of springs or other devices may be used to provide an opening force for opening the cover 20 off of the housing 18.

The seeker assembly 10, with the foil seal 44, provides the advantage of avoiding elastomer-to-metal adhesion problems. Such adhesion can cause unpredictable loads, and avoiding it allows for relatively low, predictable, and consistent deployment loads. The use of the foil seal 44 in the seeker assembly 10 can also avoid the introduction of foreign objects (such as pieces of O-ring seals or other seals) in the vicinity of the seeker 14.

Although the illustrated embodiment involves a seeker assembly, it will be appreciated that the foil seal and sealing mechanism described above may be used in other fields of endeavor as well. Some other possible fields of endeavor include military or space vehicles, mechanisms, doors, covers and devices that require very low FOD conditions, strict moisture control and must reliably deploy one time on command at a given moment after possibly long term storage. Space examples may include covers, doors or hatches for satellites, telescopes or deep space explorers. Military examples may include missile launch tube and canister covers.

Figure 7:
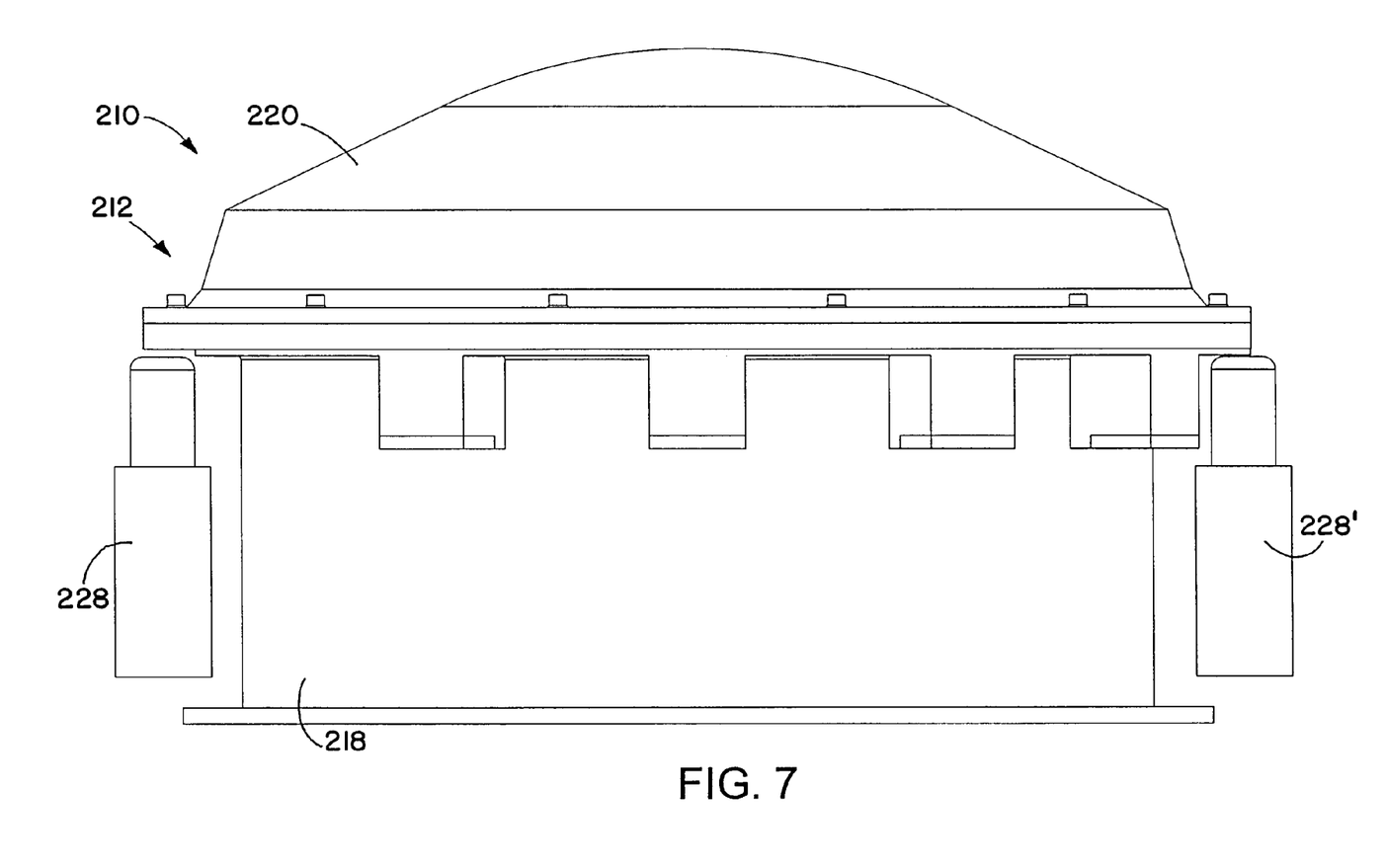
FIG. 7 is a side view of a seeker assembly in accordance with an alternate embodiment of the present invention.

FIG. 7 shows an alternate embodiment seeker assembly 210 which includes a container 212 that has a housing 218 capped by a removable cover 220 that is held in place by a pair of tension release devices 228 and 228'. The seeker assembly 210 differs from the seeker assembly 10 (FIG. 1) in that the seeker assembly 210 utilizes the two tension release devices 228 and 228' in place of the hinge 24 (FIG. 1) and the tension release device 28 (FIG. 1) of the seeker assembly 10. Other parts of the two seeker assemblies 10 and 210 may be similar or substantially the same. Releasing the tension release devices 228 and 228' allows spring forces to lift the cover 220 completely off of and out of engagement with the housing 218. It will be appreciated that a wide variety of other releasable sealed mechanical connections are possible between a pair of container parts, such as a cover and a housing.

Although the invention has been shown and described with respect to a certain preferred embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A seeker assembly comprising:
   a seeker housing;

an optical seeker in the seeker housing;
a removable cover covering an opening of the seeker housing; and
a foil seal between the cover and the housing;
wherein the foil seal separates (divides) at least in part as the cover is opened;
wherein the foil seal is internal to the seeker assembly, with a separating portion of the foil seal inside an outer surface of the seeker assembly defined by the seeker housing and the removable cover, and with the separating portion entirely enclosed by the housing and the cover.

2. The seeker assembly of claim 1,
wherein the foil seal is an annular foil seal;
wherein an outer portion of the foil seal is mechanically coupled to the cover; and
wherein an inner portion of the foil seal is mechanically coupled to the housing.

3. The seeker assembly of claim 2,
wherein the outer portion is clamped to the cover by an outer ring that is coupled to the outer cover by a first series of bolts; and
wherein the inner portion is clamped to the housing by an inner ring that is coupled to the outer cover by a second series of bolts.

4. The seeker assembly of claim 3, wherein the rings and the foil seal are made of the same material.

5. The seeker assembly of claim 3,
further comprising a pair of O-ring seals pressed against opposite major surfaces of the foil seal;
wherein one of the O-ring seals is between the outer ring and the outer portion of the foil seal; and
wherein the other of the O-ring seals is between the inner ring and the inner ring seal.

6. The seeker assembly of claim 1, further comprising a pair of O-ring seals pressed against opposite major surfaces of the foil seal.

7. The seeker assembly of claim 1, wherein the foil seal is a metal foil seal.

8. The seeker assembly of claim 1, wherein the foil seal is a metalized plastic foil.

9. The seeker assembly of claim 1, wherein the foil seal is 0.038 mm to 0.25 mm (1.5 mils to 10 mils) thick.

10. The seeker assembly of claim 1, wherein the foil seal is 0.025 mm to 0.063 mm (1 mil to 2.5 mils) thick.

11. The seeker assembly of claim 1, further comprising a cutter that at least in part separates the foil seal as the cover is opened.

12. The seeker assembly of claim 11, wherein the cutter is an annular serrated surface of a part of the seeker assembly.

13. The seeker assembly of claim 11,
wherein the outer portion is clamped to the cover by an outer ring;
wherein the inner portion is clamped to the housing by an inner ring; and
wherein the cutter is part of one of the rings.

14. The seeker assembly of claim 13,
further comprising a pair of O-ring seals pressed against opposite major surfaces of the foil seal;
wherein one of the O-ring seals is between the outer ring and the outer portion of the foil seal; and
wherein the other of the O-ring seals is between the inner ring and the inner ring seal.

15. The seeker assembly of claim 14, wherein the outer ring is coupled to the outer cover by a first series of bolts; and
wherein the inner ring is coupled to the outer cover by a second series of bolts.

16. The seeker assembly of claim 1, further comprising:
a hinge hingedly coupling the cover to the housing; and
a tension release device releasably holding the cover against the housing.

17. The seeker assembly of claim 16,
further comprising resilient devices in spring cavities spaced around a circumference of the housing;
wherein the resilient devices provide force to push the cover off of the housing when the tension release device is released.

18. The seeker assembly of claim 17, wherein the resilient devices include:
Belleville washers in some of the spring cavities; and
coil springs in other of the spring cavities;
wherein the coil springs have a lower lifting force than the Belleville washers;
wherein the coil springs have a longer range of travel than the Belleville washers; and
wherein, when the tension release device is released, the Belleville washers provide initial impetus to begin motion of the cover, and the coil springs provide force to continue opening of the cover.

19. The seeker assembly of claim 1, wherein the foil seal is planar.

20. A method of opening a sealed container, the method comprising:
releasing a tension release device holding a cover against a housing; and
pivoting the cover about a hinge that connects the cover to the housing;
wherein the pivoting includes separating (dividing) at least part of a foil seal that provides sealing between the cover and the housing prior to the releasing;
wherein the foil is an annular foil seal having an outer portion, a middle portion, and an inner portion;
wherein the separating includes tearing or rupturing at least part of the middle portion, while the outer portion remains fixedly coupled to the cover and the inner portion remains fixed coupled to the housing;
wherein an outer ring clamps the outer portion to the cover;
wherein an inner ring clamps the inner portion to the housing;
wherein the separating includes a cutter on one of the rings separating the at least part of the foil seal; and
wherein the foil seal is internal to the seeker assembly, with the middle portion of the foil seal inside an outer surface of the seeker assembly defined by the seeker housing and the removable cover, and with the middle portion entirely enclosed by the housing and the cover.

21. The method of claim 20,
wherein the sealed container contains an optical seeker within the housing; and
wherein the pivoting uncovers the optical seeker.

22. A sealed container comprising:
a housing;
a cover; and
an annular foil seal between the housing and the cover;
wherein substantially all of the foil seal is internal to the container, inside an outer surface of the container defined by the housing and the cover, and entirely enclosed by the housing and the cover; and
wherein, when the cover is opened, the foil seal separates, with a first part of the foil seal remaining attached to the cover, and a second part of the foil seal remaining attached to the housing.

* * * * *